United States Patent
Chiao

(10) Patent No.: US 9,138,816 B2
(45) Date of Patent: Sep. 22, 2015

(54) METHOD FOR USING A DOUBLE-ACTING BAND SAW TO CUT A PIPE

(71) Applicant: EVERISING MACHINE CO., Taichung (TW)

(72) Inventor: Shu-Chia Chiao, Taichung (TW)

(73) Assignee: Everising Machine Co., Taichung ( * ) Notice: Subject to any disclaimer, the term of this patent is extended or adjusted under 35 U.S.C. 154(b) by 300 days.

(21) Appl. No.: 13/667,840

(22) Filed: Nov. 2, 2012

(65) Prior Publication Data
US 2013/0112054 A1    May 9, 2013

(30) Foreign Application Priority Data

Nov. 4, 2011    (TW) .............................. 100220860 U

(51) Int. Cl.
*B23D 53/06*    (2006.01)
*B23D 55/04*    (2006.01)

(52) U.S. Cl.
CPC .............. *B23D 53/06* (2013.01); *B23D 55/046* (2013.01); *Y10T 83/0524* (2015.04); *Y10T 83/655* (2015.04)

(58) Field of Classification Search
CPC ........ B26D 3/001; B26D 3/162; B26D 3/164; B26D 3/166; B26D 3/167; B26D 3/168; B23D 53/026; B23D 53/006; B23D 53/06; B23D 59/00; B27B 15/00; B27B 15/02; Y10T 83/655; Y10T 83/0524
USPC .................. 30/380; 83/35, 36, 733, 809–813; D15/134; 82/101, 123, 124
See application file for complete search history.

(56) References Cited

U.S. PATENT DOCUMENTS

| | | | | | |
|---|---|---|---|---|---|
| 2,801,652 | A | * | 8/1957 | Meeker, Sr. ...................... | 83/809 |
| 2,932,229 | A | * | 4/1960 | Crane ............................. | 83/409 |
| 3,077,132 | A | * | 2/1963 | Whitmore ........................ | 83/74 |
| 3,084,233 | A | * | 4/1963 | Von Ohlsen .............. | 200/61.52 |
| 3,352,186 | A | * | 11/1967 | Cleland .......................... | 83/820 |
| 3,385,330 | A | * | 5/1968 | Haynes ........................... | 83/799 |
| 3,530,752 | A | * | 9/1970 | Washio et al. .................. | 83/820 |
| 3,554,244 | A | * | 1/1971 | Biscardi ......................... | 83/802 |
| 3,566,731 | A | * | 3/1971 | Ensley ............................ | 83/799 |
| 3,680,417 | A | * | 8/1972 | Wells .............................. | 83/74 |
| 3,991,644 | A | * | 11/1976 | Sugimoto ....................... | 83/800 |
| 3,995,521 | A | * | 12/1976 | Raphael ...................... | 83/410.9 |

(Continued)

FOREIGN PATENT DOCUMENTS

| | | | |
|---|---|---|---|
| DE | 19610244 A1 | * | 9/1997 |
| EP | 0152237 A2 | * | 8/1985 |
| JP | 10076423 A | * | 3/1998 |

*Primary Examiner* — Jason Daniel Prone
(74) *Attorney, Agent, or Firm* — Wang Law Firm, Inc.; Li K. Wang; Stephen Hsu

(57) ABSTRACT

A double-acting pipe cutting band saw apparatus and method for using the same are capable of cutting a relatively large workpiece with a relatively small size band saw blade, furthermore, it improves the cutting efficiency and life of the band saw blade. Since the pipe to be cut is put on a rotary table which is mounted a slide table, it can be continuously rotated and moved with respect to the band saw assembly during the cutting operation. Hence, the pipe to be cut can be completely cut by a band saw blade whose operable cutting length of the band saw blade does not have to be larger than the diameter of the pipe, which reduces cutting time while improving cutting efficiency. The service life of the band saw blade is extended since the cutting operation is not just performed by the rotation of the band saw blade.

4 Claims, 4 Drawing Sheets

(56) References Cited

U.S. PATENT DOCUMENTS

| | | | | |
|---|---|---|---|---|
| 4,016,787 A | * | 4/1977 | Sugimoto | 83/13 |
| 4,270,426 A | * | 6/1981 | Raphael | 83/410.9 |
| 4,357,848 A | * | 11/1982 | Sakurai et al. | 83/801 |
| 4,364,294 A | * | 12/1982 | Eccardt | 83/796 |
| 4,432,260 A | * | 2/1984 | Sarurai et al. | 83/13 |
| 4,454,795 A | * | 6/1984 | Ellis | 83/820 |
| 4,546,682 A | * | 10/1985 | Howard | 83/13 |
| 4,557,168 A | * | 12/1985 | Tokiwa | 83/56 |
| 4,674,374 A | * | 6/1987 | Sadahiro et al. | 83/62.1 |
| 4,805,500 A | * | 2/1989 | Saito et al. | 83/277 |
| 5,035,166 A | * | 7/1991 | Carlson et al. | 83/801 |
| 5,043,907 A | * | 8/1991 | Richards | 83/33 |
| 5,062,335 A | * | 11/1991 | Missler | 83/168 |
| 5,213,022 A | * | 5/1993 | Elgan | 83/813 |
| 5,231,905 A | * | 8/1993 | Trahan | 83/439 |
| 5,261,304 A | * | 11/1993 | Stollenwerk et al. | 83/410.8 |
| 5,347,903 A | * | 9/1994 | Stolzer | 83/796 |
| D400,216 S | * | 10/1998 | Lin | D15/134 |
| 5,878,644 A | * | 3/1999 | Jasinski | 83/812 |
| 6,021,772 A | * | 2/2000 | Seifert et al. | 83/100 |
| 6,244,144 B1 | * | 6/2001 | Goldie | 83/13 |
| 6,401,579 B2 | * | 6/2002 | Lei | 83/13 |
| 6,470,780 B1 | * | 10/2002 | Benuzzi | 83/733 |
| 6,571,674 B2 | * | 6/2003 | Benuzzi | 83/733 |
| D478,918 S | * | 8/2003 | Casanova | D15/134 |
| 6,651,541 B2 | * | 11/2003 | Faircloth | 83/733 |
| 7,201,092 B2 | * | 4/2007 | Wang | 83/813 |
| 7,645,093 B1 | * | 1/2010 | Clark et al. | 405/173 |
| 8,261,647 B2 | * | 9/2012 | Dale | 83/764 |
| 8,813,620 B2 | * | 8/2014 | Tokiwa | 83/375 |
| 2002/0007708 A1 | * | 1/2002 | Freeman | 83/36 |
| 2003/0167894 A1 | * | 9/2003 | Missler | 83/816 |
| 2007/0089576 A1 | * | 4/2007 | Aihara | 83/13 |
| 2010/0031798 A1 | * | 2/2010 | Wang | 83/800 |
| 2011/0030527 A1 | * | 2/2011 | Yoo | 83/809 |
| 2013/0312582 A1 | * | 11/2013 | Chiao | 83/812 |
| 2015/0020327 A1 | * | 1/2015 | Jeng et al. | 15/88.3 |

* cited by examiner

METHOD FOR USING A DOUBLE-ACTING BAND SAW TO CUT A PIPE

CROSS REFERENCE TO RELATED APPLICATION

The present application claims the benefit of priority to TW 100220860, filed on Nov. 4, 2011 with the Intellectual Property Office of the Republic of China, Taiwan, the entire specification of which is incorporated herein by reference.

FIELD OF THE INVENTION

The present invention relates to a pipe cutting method and device, and more particularly to a double-acting pipe cutting band saw apparatus and a method for using the same.

DESCRIPTION OF THE PRIOR ART

Band saw apparatuses are common machines, and conventional band saw apparatus mostly work in such a way that the band saw blade is driven to rotate continuously to cut the workpiece which is clamped in a stationary manner. Since the workpiece is stationary, the band saw must have an operable cutting length which is larger than the size of the workpiece, so that the workpiece can be cut completely. In this case, the band saw apparatus will be very large if the workpiece to be cut is large.

The present invention has arisen to mitigate and/or obviate the afore-described disadvantages.

SUMMARY OF THE INVENTION

The primary objective of the present invention is to provide a double-acting pipe cutting band saw apparatus which is capable of cutting a relatively large workpiece with a relatively small size band saw, furthermore, it improves the cutting efficiency and life of the band saw.

To achieve the above objective, a double-acting pipe cutting band saw apparatus in accordance with the present invention comprises: a base, a slide table, a rotary table, a clamp unit, and a band saw assembly. The base is provided with a rail extending in an axial direction. At a bottom of the slide table is provided a slide block which is to be slidably mounted on the rail of the base to enable the slide table to be capable of sliding in the axial direction. The rotary table is rotatably mounted on the slide table and includes a shaft extending in a radial direction, the rotary table is rotatable with respect to the shaft and provided with a plurality of slide grooves which are equiangularly arranged around the shaft. The clamp unit is mounted on the rotary table and including a plurality of clamps which are slidably disposed the slide grooves of the rotary table. The band saw assembly includes a frame, two rollers rotatably disposed in the frame, and a band saw blade which is put on and rotated by the rollers.

Another objective of the present invention is to provide a method for using the double-acting pipe cutting band saw apparatus to cut the pipe, and the method is capable of improving the cutting efficiency, reducing the size of the band saw, and extending the life of the band saw.

To achieve this objective, a method for using the double-acting pipe cutting band saw apparatus in accordance with the present invention comprises:

a step of fixing the pipe to be cut and making the pipe to be cut horizontally movable and rotatable;

step of rotating a band saw blade which is disposed in a frame; and step of pipe working, including a plurality of intermittent processes which are carried out continuously, each of the intermittent processes including a cutting process, a discharging process, a rotating process and a feeding process, after moving into a cutting area of the band saw blade, the pipe to be cut is continuously moved into contact with the band saw blade, so that the cutting process is carried out by the band saw blade, during the cutting process, only a part of the pipe to be cut is cut, after the cutting process, the discharging process is carried out to move the pipe to be cut back away from the band saw blade, after that, the rotating process is carried out to rotate the pipe to be cut to a position where the uncut part of the pipe is rotated to face the band saw blade, then, the feeding process is carried out to move the pipe to be cut close to the band saw blade, making it ready for the next pipe working.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
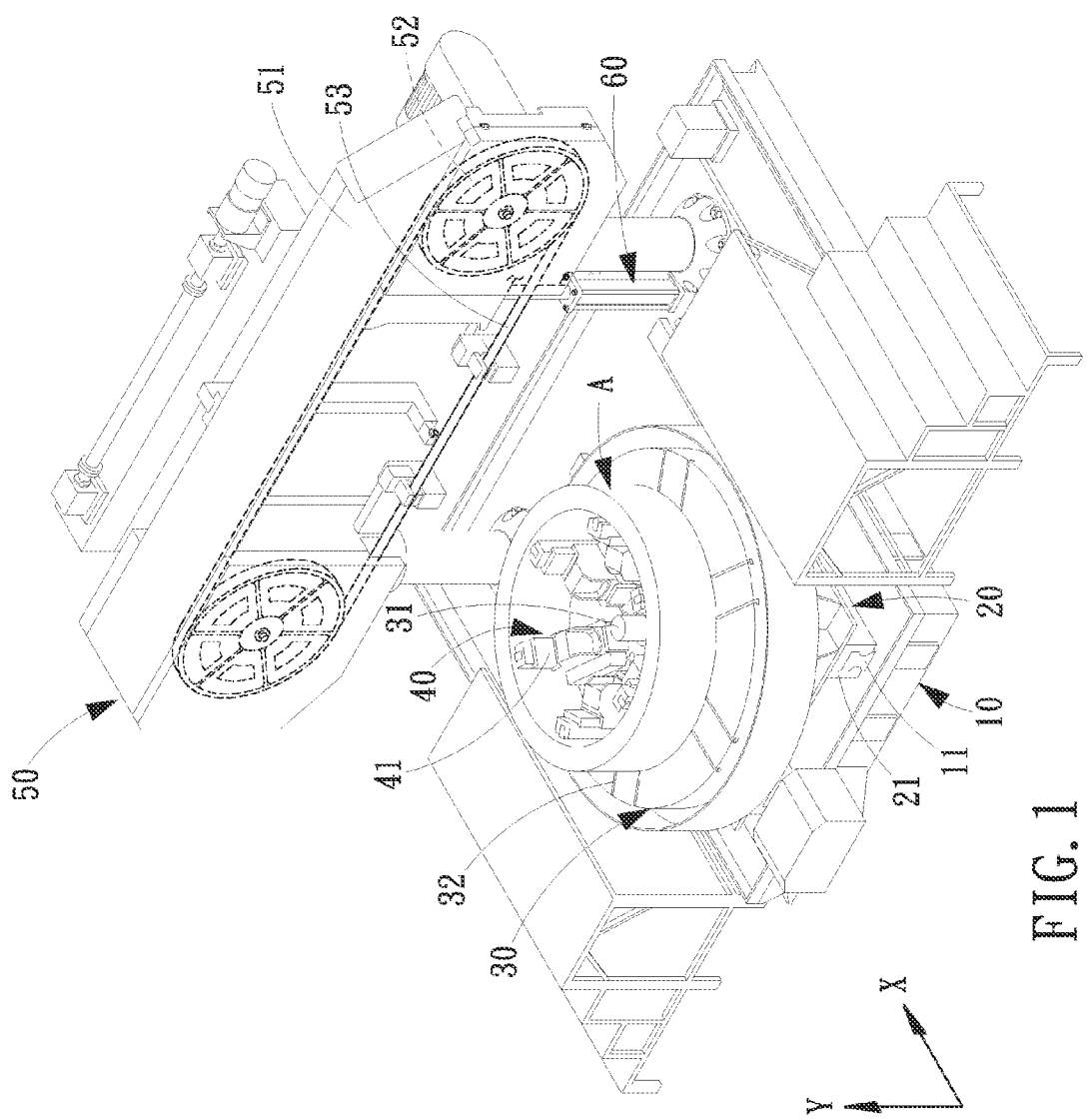
FIG. 1 is a perspective view showing that a double-acting pipe cutting band saw apparatus in accordance with the present invention is cutting a pipe with a relatively small diameter.
Figure 2:
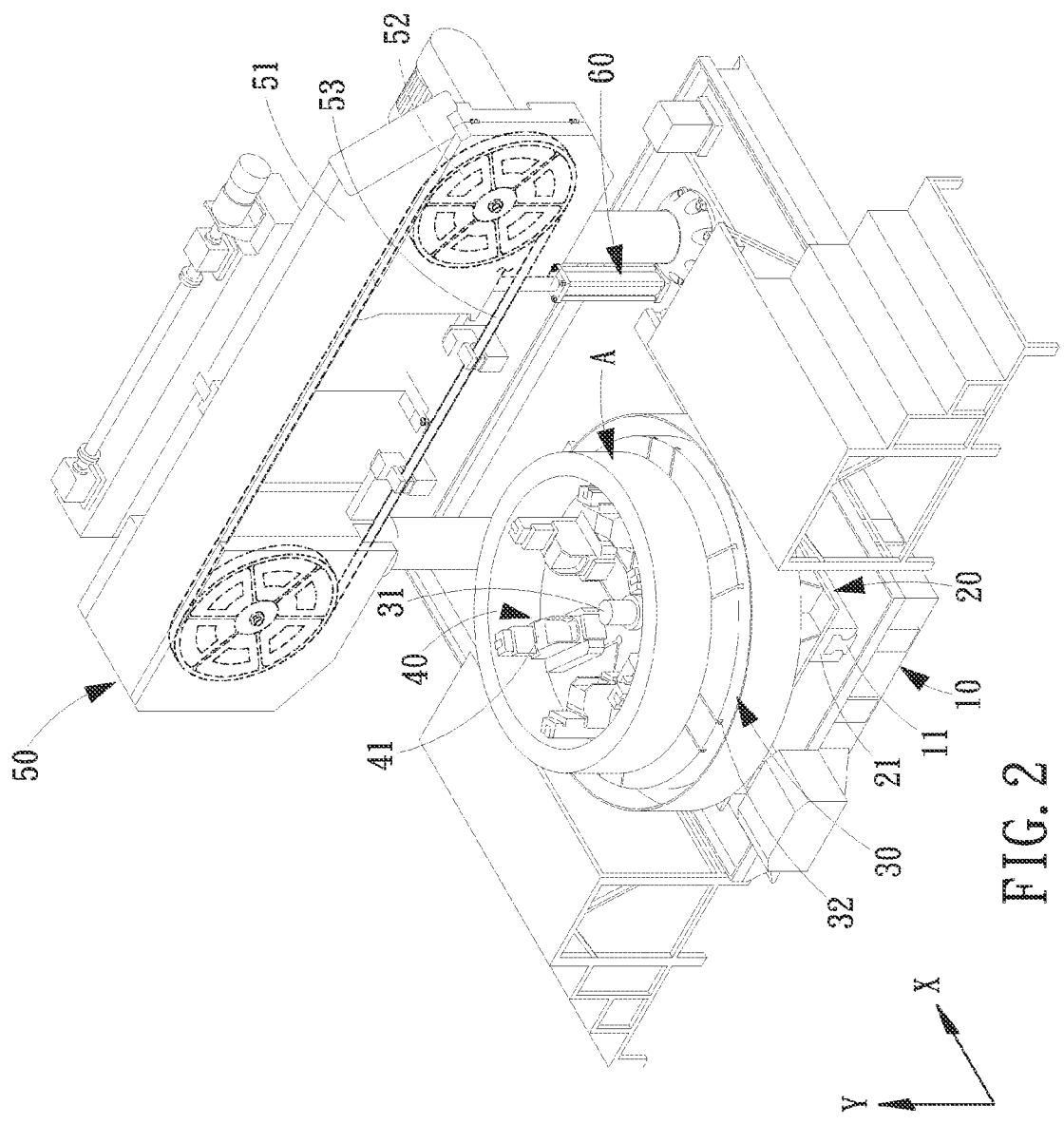
FIG. 2 is a perspective view showing that a double-acting pipe cutting band saw apparatus in accordance with the present invention is cutting a pipe with a relatively large diameter.

Referring to FIGS. 1 and 2, a double-acting pipe cutting band saw apparatus in accordance with the present invention comprises: a base 10, a slide table 20, a rotary table 30, a clamp unit 40, a band saw assembly 50 and a balance cylinder 60.

The base 10 is provided with a rail 11 extending in an axial direction X.

At a bottom of the slide table 20 is provided a slide block 21 which is to be slidably mounted on the rail 11 of the base 10, so that the slide table 20 is capable of sliding in the axial direction X.

The rotary table 30 is rotatably mounted on the slide table 20 and includes a shaft 31 extending in a radial direction Y. The rotary table 30 is rotatable with respect to the shaft 31 and provided with a plurality of slide grooves 32 which are equiangularly arranged around the shaft 31.

The clamp unit 40 is mounted on the rotary table 30 and includes a plurality of clamps 41 which are disposed in and movable with respect to the slide grooves 32 of the rotary table 30.

The band saw assembly 50 includes a frame 51, two rollers 52 and a band saw blade 53. The two rollers 52 are rotatably disposed in the frame 51, and the band saw blade 53 is put on and rotated by the rollers 52.

The balance cylinder 60 is supported between the frame 51 and the base 10 to balance the frame 51.

To perform a pipe cutting operation with the double-acting pipe cutting band saw apparatus of the present invention, the pipe A to be cut should be placed on the rotary table 30 to encircle the clamps 41 of the clamp unit 40. At this moment, the clamps 41 of the clamp unit 40 can be adjusted to fit the size of the pipe A to be cut. For example, as shown in FIG. 1, when the pipe A has a relatively small diameter, the clamps 41 can be moved close to the shaft 31 of the rotary table 30 to press against the inner periphery of the pipe A, or, as shown in FIG. 2, the pipe A has a relatively large diameter, the clamps 41 can be moved away from the shaft 31 of the rotary table 30 to press against the inner periphery of the pipe A, so that the pipe A to be cut is fixed.

After the pipe A to be cut is positioned on the rotary table 30, the position of the slide table 20 can also be adjusted based on the size of the pipe A to be cut, namely, the slide table 20 can slide to move the pipe A to be cut close to the band saw assembly 50. Meanwhile, the height of the frame 51 of the band saw assembly 50 can be adjusted to best fit the height of the pipe A to be cut.

During the cutting operation, the two rollers 52 of the band saw assembly 50 rotate the band saw blade 53. Meanwhile, the rotary table 30 also rotates, and the slide table 20 slides close to the band saw assembly 50, so that both the band saw blade 53 and the pipe A to be cut are movable. Since the pipe A to be cut is put on the rotary table 30, it can be continuously rotated with respect to the band saw assembly 50 during the cutting operation. Hence, the pipe A to be cut can be completely cut by the band saw blade 53, and the operable cutting length of the band saw blade 53 does not have to be larger than the diameter of the pipe A to be cut, which reduces cutting time while improving cutting efficiency. On top of that, the service life of the band saw blade 53 is extended since the cutting operation is not just performed by the rotation of the band saw blade.

Therefore, the double-acting pipe cutting band saw apparatus in accordance with the present invention is suitable for cutting large-scale pipe A.

Figure 3:
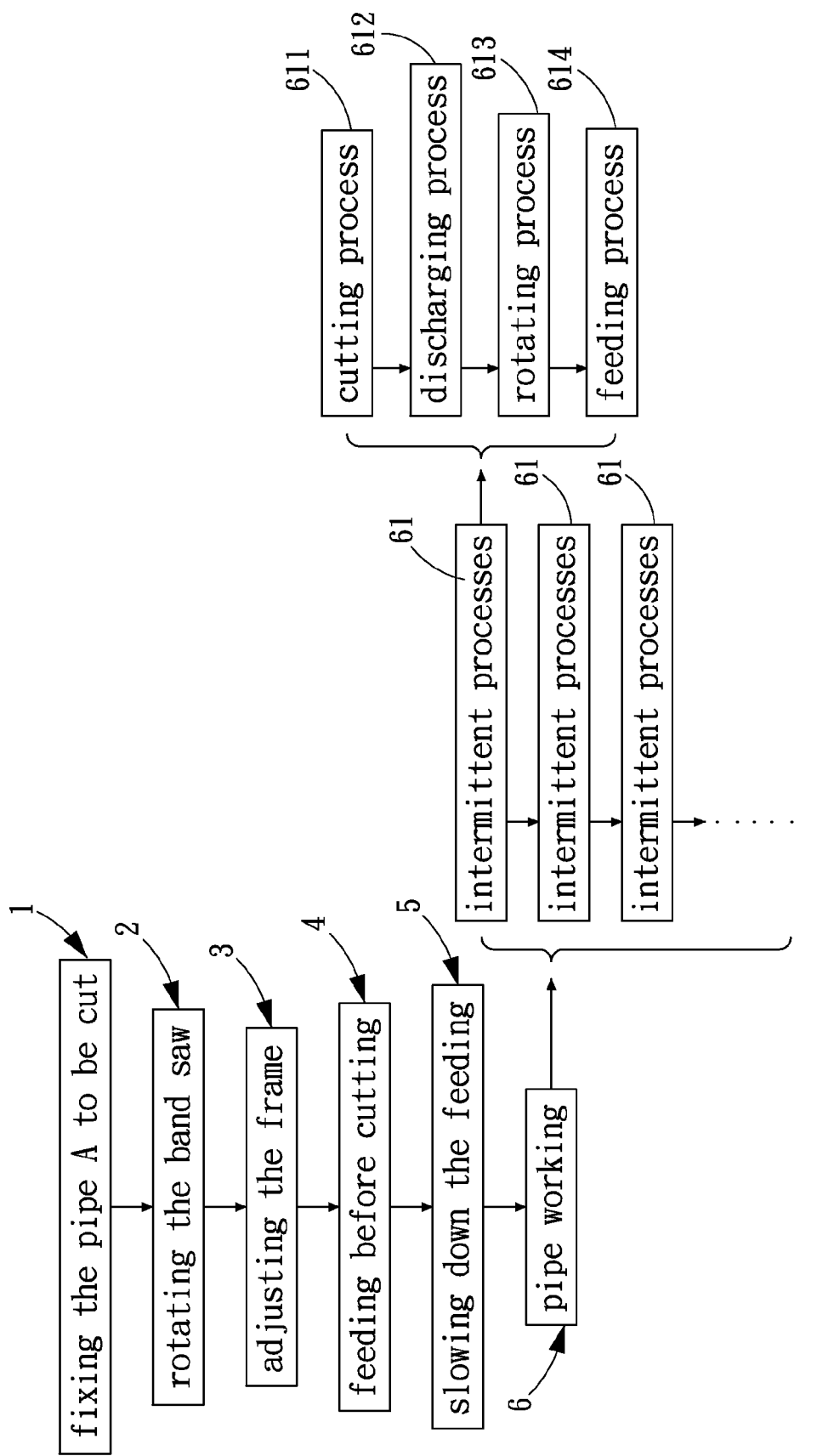
FIG. 3 is a flow chart view showing a method for using the double-acting pipe cutting band saw apparatus to cut the pipe in accordance with the present invention.
Figure 4:
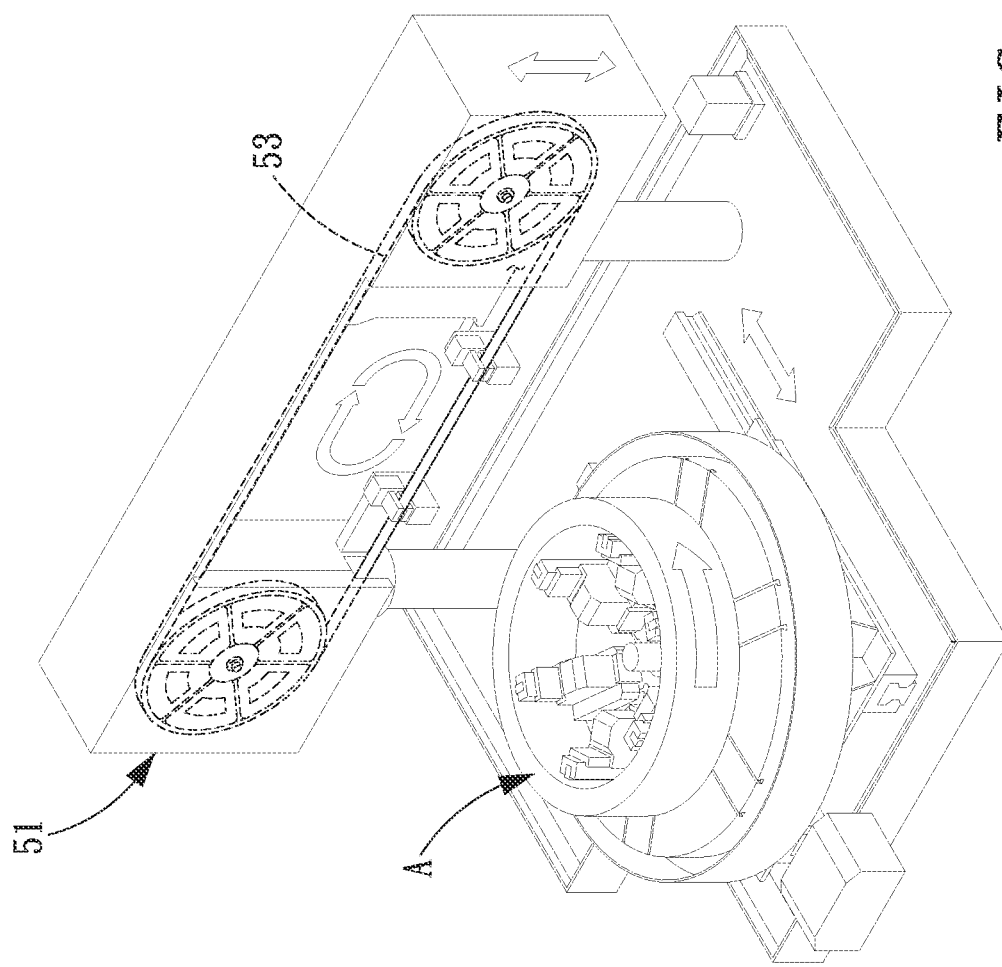
FIG. 4 is an illustrative view showing the method for using the double-acting pipe cutting band saw apparatus to cut the pipe in accordance with the present invention.

Referring to FIGS. 3 and 4, a method for using the double-acting pipe cutting band saw apparatus to cut the pipe A in accordance with the present invention comprises:

step 1 of fixing the pipe A to be cut: fixing the pipe A to be cut by pressing against an inner periphery of the pipe A to be cut, and making the pipe A to be cut horizontally movable and rotatable;

step 2 of rotating the band saw: rotating the band saw blade 53 which is disposed in the frame 51;

step 3 of adjusting the frame: adjusting the height of the frame 51 to better fit the pipe A to be cut;

step 4 of feeding before cutting: feeding the pipe A to be cut by moving it close to the band saw blade 53 in the frame 51;

step 5 of slowing down the feeding: slowing down the feeding speed after the pipe A to be cut is moved to an cutting area of the band saw blade 53;

step 6 of pipe working: including a plurality of intermittent processes 61 which are carried out continuously, each of the intermittent processes 61 includes a cutting process 611, a discharging process 612, a rotating process 613 and a feeding process 614. After moving into the cutting area of the band saw blade 53, the pipe A to be cut is continuously moved into contact with the band saw blade 53, so that the cutting process 611 is carried out by the band saw blade 53. During the cutting process 611, only a part of the pipe A to be cut is cut. After the cutting process 611, the discharging process 612 is carried out to move the pipe A to be cut back away from the band saw blade 53. After that, the rotating process 613 is carried out to rotate the pipe A to be cut to a position where the uncut part of the pipe is rotated to face the band saw blade 53. At this moment, the feeding process 614 is carried out to move the pipe A to be cut close to the band saw blade 53, making it ready for the next pipe working 6.

It is clear from the above description that the cutting method of the present invention employs the pipe working 6 to cut the pipe A, and the pipe working 6 includes a plurality of intermittent processes 61. The number of intermittent processes 61 depends on the size of the pipe A to be cut, the bigger the pipe A to be cut is, the more intermittent processes 61 will be involved.

The cutting operation of the present invention is mainly achieved by these intermittent processes 61, and each of the intermittent processes 61 includes a cutting process 611, a discharging process 612, a rotating process 613 and a feeding process 614. After each cutting process 611 is performed, the pipe A to be cut will be moved back (the discharging process 612), rotated an angle (the rotating process 613) and moved close to the band saw blade again (the feeding process 614). With the rotation and horizontal slide of the pipe A to be cut, the pipe A can be cut step by step so as to reduce the cutting volume and cutting depth at each time the band saw blade 53 cuts, which consequently reduces the wear and tear and improves the life of the band saw blade 53. Furthermore, with less cutting volume and depth, the pipe working allows the band saw blade run more easily without the problem that the band saw blade may get stuck due to large amount of cutting.

Similarly, due to the pipe working, the pipe A can be cut by a band saw blade 53 whose operable cutting length does not have to be larger than the diameter of the pipe A to be cut, which substantially reduces the size of the band saw blade.

While we have shown and described various embodiments in accordance with the present invention, it is clear to those skilled in the art that further embodiments may be made without departing from the scope of the present invention.

What is claimed is:

1. A method for using a double-acting pipe cutting band saw apparatus to cut a pipe comprising; a base with a rail extending in an axial direction; a slide table provided with a slide block which is located at a bottom of the slide table and to be slidably mounted on the rail of the base to enable the slide table to be capable of sliding in the axial direction; a rotary table rotatably mounted on the slide table and including a shaft extending in a radial direction, the rotary table being rotatable with respect to the shaft and provided with a plurality of slide grooves which are equiangularly arranged around the shaft; a clamp unit mounted on the rotary table and including a plurality of clamps which are slidably disposed in the slide grooves of the rotary table; and a band saw assembly including a frame, two rollers rotatably disposed in the frame, and a band saw blade which is rotated by the rollers; the method comprising the following steps:

a step of fixing the pipe to be cut and making the pipe to be cut horizontally movable and rotatable;

step of rotating the band saw blade; and step of pipe working, including a plurality of intermittent processes which are carried out continuously, each of the intermittent processes including a cutting process, a discharging process, a rotating process and a feeding process, after moving into a cutting area of the band saw blade, the pipe to be cut is continuously moved into contact with the band saw blade, so that the cutting process is carried out by the band saw blade, during the cutting process, only a part of the pipe to be cut is cut, after the cutting process, the discharging process is carried out to move the pipe to be cut back away from the band saw blade, after that, the rotating process is carried out to rotate the pipe to be cut to a position where an uncut part of the pipe is rotated to face the band saw blade, then, the feeding process is carried out to move the pipe to be cut close to the band saw blade, making it ready for a next one of the intermittent processes.

2. The method for using the double-acting pipe cutting band saw apparatus to cut the pipe as claimed in claim 1, wherein the step of fixing the pipe to be cut is carried out by pressing against an inner periphery of the pipe to be cut.

3. The method for using the double-acting pipe cutting band saw apparatus to cut the pipe as claimed in claim 1 further comprises a step of adjusting a height of the frame to better fit the pipe to be cut, and the step of adjusting the height of the frame is performed between the step of rotating the band saw blade and the step of pipe working.

4. The method for using the double-acting pipe cutting band saw apparatus to cut the pipe as claimed in claim 1 further comprises a step of slowing down a feeding speed of moving the pipe to be cut after the pipe to be cut is moved to the cutting area of the band saw blade, and this step is carried out before the step of pipe working.

* * * * *